United States Patent
Ni et al.

(10) Patent No.: US 7,868,570 B2
(45) Date of Patent: Jan. 11, 2011

(54) DEVICE AND METHOD FOR CONTROLLING BRUSHLESS DC ELECTRIC MACHINE

(75) Inventors: Jian Ni, Shanghai (CN); Lijian Wu, Shanghai (CN); Wanbing Jin, Shanghai (CN); Jianping Ying, Shanghai (CN); Shih-Ming Huang, Taoyuan County (TW); Wen-Shi Huang, Taoyuan County (TW)

(73) Assignee: Delta Electronics, Inc., Taoyuan Hsien (TW)

(*) Notice: Subject to any disclaimer, the term of this patent is extended or adjusted under 35 U.S.C. 154(b) by 498 days.

(21) Appl. No.: 11/950,131

(22) Filed: Dec. 4, 2007

(65) Prior Publication Data
US 2008/0292292 A1 Nov. 27, 2008

(30) Foreign Application Priority Data
May 22, 2007 (TW) .............................. 96118258 A

(51) Int. Cl.
*H02P 6/00* (2006.01)
*H02P 6/14* (2006.01)
(52) U.S. Cl. .............................. 318/400.01; 318/254.1; 318/738; 388/800; 388/801
(58) Field of Classification Search ................. 388/800, 388/801; 318/400.01, 254.1, 738
See application file for complete search history.

(56) References Cited

U.S. PATENT DOCUMENTS

| 4,276,504 A | 6/1981 | Nagase et al. |
| 5,847,524 A * | 12/1998 | Erdman et al. .......... 318/400.14 |
| 6,972,534 B1 * | 12/2005 | Schulz et al. .......... 318/400.02 |
| 2006/0132076 A1 | 6/2006 | Finsinger et al. |

FOREIGN PATENT DOCUMENTS

| CN | 1063598 C | 3/2001 |
| WO | 9627233 A1 | 9/1996 |
| WO | 9733363 A1 | 9/1997 |

* cited by examiner

*Primary Examiner*—Bentsu Ro
*Assistant Examiner*—Erick Glass
(74) *Attorney, Agent, or Firm*—Volpe and Koenig, P.C.

(57) ABSTRACT

A controller of a brushless DC electric machine having a rotor and at least a stator winding powered by a driving voltage is provided. The controller includes a position sensor, an advance angle control circuit, and a driving circuit. The position sensor is moved along a reverse rotating direction of the rotor by a prepositioned angle for outputting a position signal. The advance angle control circuit receives the position signal and a driving voltage reproduction signal reproduced from the driving voltage and outputs a commutation control signal lagging the position signal by a first delay time. The driving circuit receives the commutation control signal for outputting a driving signal for controlling a commutation of the brushless DC electric machine.

11 Claims, 12 Drawing Sheets

DEVICE AND METHOD FOR CONTROLLING BRUSHLESS DC ELECTRIC MACHINE

FIELD OF THE INVENTION

The present invention relates to a device and a method for controlling a brushless DC electric machine, and more particularly to a device and a method for controlling an advance angle of the brushless DC electric machine.

BACKGROUND OF THE INVENTION

A permanent magnetic electric machine is classified as a permanent sine-wave electric machine and a permanent trapezoidal-wave electric machine (brushless DC electric machine). Take a motor for example, the permanent sine-wave motor has a back electromotive force of a sine wave and fits a stator current of another sine wave for producing a constant torque. Otherwise, the brushless DC electric machine has a back electromotive force of a trapezoidal wave and fits a stator current of a square wave for producing a constant torque.

The brushless DC electric machine includes a rotor and a stator winding by at least a winding. Due to the existence of a winding inductance, a winding voltage must lead a back electromotive force by an angle known as an advance angle which is an important factor affecting the efficiency and the noise of the electric machine. An optimum advance angle is related to the rotating speed of the rotor. The higher the rotating speed is, the greater the optimum advance angle will be. A typical controller of the brushless DC electric machine does not control the advance angle, so that the performance of the electric machine is worse in the whole scope of the rotating speed.

At present, common methods are as follows. The first method uses software or a digital signal processor for controlling the advance angle and is disclosed in the US Publication No. 2006/0132076 A1. Good as the effect of this control method is, the cost is higher.

The second method uses hardware for controlling the advance angle and is disclosed in the U.S. Issuance Pat. No. 4,276,504. Please refer to FIG. 1(a), which is a schematic block diagram disclosed in the U.S. Pat. No. 4,276,504 showing a conventional system for controlling an advance angle of a brushless DC electric machine. Afterward, please refer to FIG. 1(b), which is a schematic diagram showing a relation between the advance angle and a motor rotating speed of the system in FIG. 1(a). As shown in FIG. 1(b), the used advance angle is a small fixed value while there is a low rotating speed (MOTOR SPEED<$S_1$), and the used advance angle is a large fixed value while there is a high rotating speed (MOTOR SPEED>$S_1$).

An optimum advance angle of the motor increases with the increment of the rotating speed in the whole scope of the rotating speed. Therefore, this control method cannot guarantee the advance angle to be optimum in the whole scope of the rotating speed. Besides, a tacho-generator is used in FIG. 1(a), which makes the structure of the control circuit complicated, so that the cost increases.

The third method also uses hardware for controlling the advance angle and is disclosed in the WO Patent No. 97/33363. Please refer to FIG. 2(a), which is a schematic diagram disclosed in the WO Patent No. 97/33363 showing a conventional circuit for controlling an advance angle of a brushless DC electric machine. Afterward, please refer to FIG. 2(b), which is a waveform diagram showing signals obtained from the circuit in FIG. 2(a). As shown in FIG. 2(b), the advance angle φ increases with the increment of the rotating speed.

However, as the circuit structure in FIG. 2(a) is a high-pass filter, the robustness of this control system is worse. Besides, only when position signals 48 and 50 are sine waves, the controlled advance angle is exact, but in general, the position signals 48 and 50 include many harmonic waves, so that the controlled advance angle is not exact.

In sum, in order to overcome the aforementioned defect, it is necessary to design a control system that the hardware circuit is stable, the cost is low, and the advance angle tends to be optimum in the whole scope of the rotating speed, which becomes the primary motive of the present invention.

SUMMARY OF THE INVENTION

It is an object of the present invention to provide a controller of a brushless DC electric machine and a method for controlling the brushless DC electric machine. Therefore, the advance angle of the electric machine tends to be optimum in the whole scope of the rotating speed, and a control module with high performance, low cost, good robustness is provided.

According to an aspect of the present invention, a controller of a brushless DC electric machine having a rotor and at least a stator winding powered by a driving voltage is provided, which includes a position sensor, an advance angle control circuit, and a driving circuit. The position sensor is moved along a reverse rotating direction of the rotor by a prepositioned angle for outputting a position signal. The advance angle control circuit receives the position signal and a driving voltage reproduction signal reproduced from the driving voltage and outputs a commutation control signal lagging the position signal by a first delay time. The driving circuit receives the commutation control signal for outputting a driving signal for controlling a commutation of the brushless DC electric machine.

According to another aspect of the present invention, a method for controlling a brushless DC electric machine having a rotor and at least a stator winding powered by a driving voltage is provided, which includes the following steps. Firstly, a position signal of the rotor is obtained by leading a position sensor with respect to a first commutation position. Next, a driving voltage reproduction signal of the driving voltage is obtained. Next, a commutation control signal lagging the position signal by a delay time based on the position signal and the driving voltage reproduction signal being inversely proportional to the delay time is output. Next, a commutation of the stator winding is driven according to the commutation control signal.

The above objects and advantages of the present invention will become more readily apparent to those ordinarily skilled in the art after reviewing the following detailed descriptions and accompanying drawings, in which:

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In the present invention, a tacho-generator is not used for obtaining a rotating speed of an electric machine, and a signal provided directly or indirectly from a winding voltage of the electric machine is used for obtaining the information of the rotating speed of the electric machine. Because the rotating speed of the electric machine increases with the increase of the winding voltage of the electric machine, illustrated in a technical term, the rotating speed is proportional to the winding voltage on the characteristic. Therefore, an optimum advance angle increases with the increase of the winding voltage. The subsequent description is illustrated for a single-phase electric machine; however, the present invention is also effective for a three-phase electric machine.

Figure 1A:
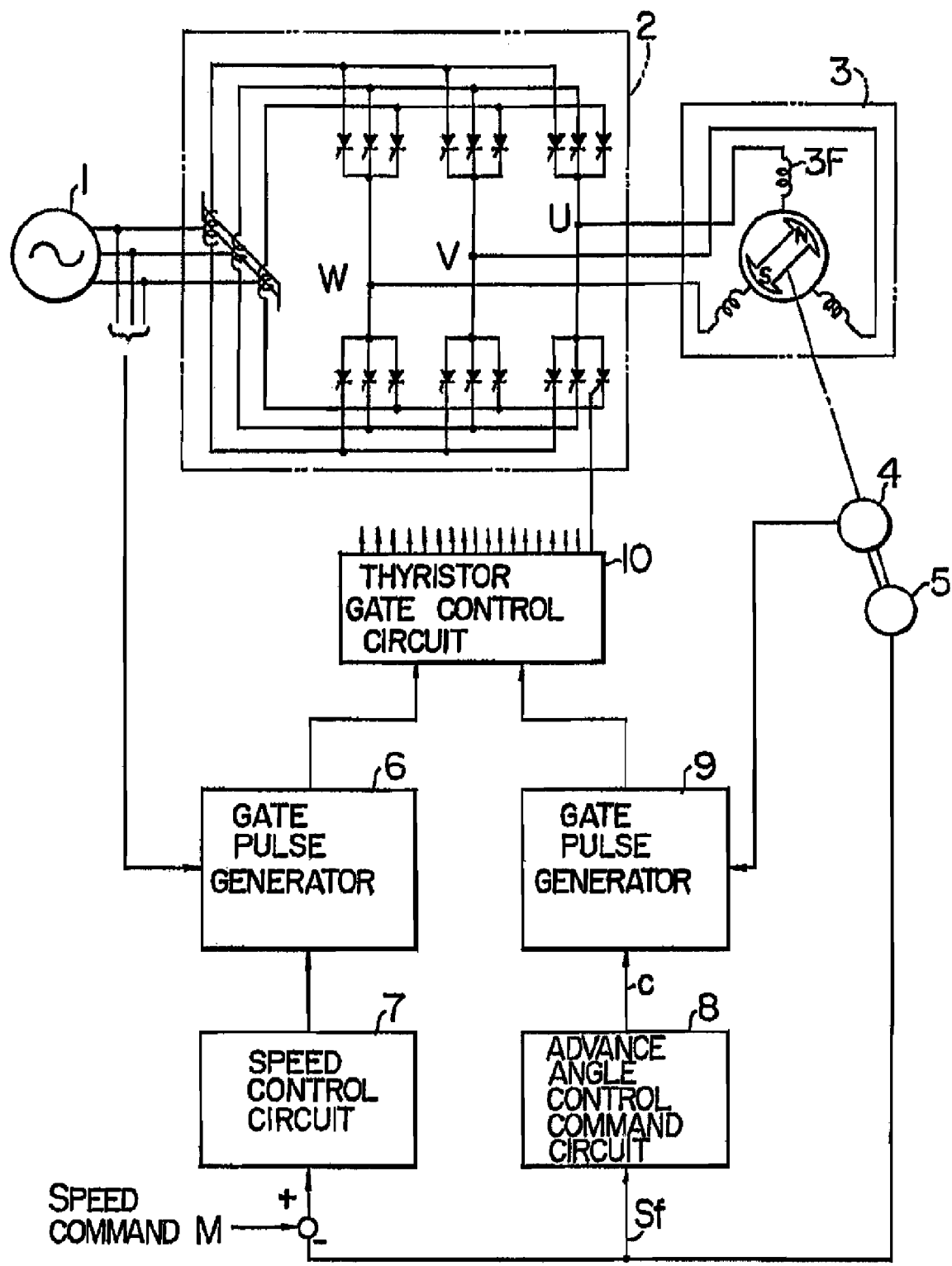
FIG. 1(a) is a schematic block diagram disclosed in the U.S. Pat. No. 4,276,504 showing a conventional system for controlling an advance angle of a brushless DC electric machine.
Figure 1B:
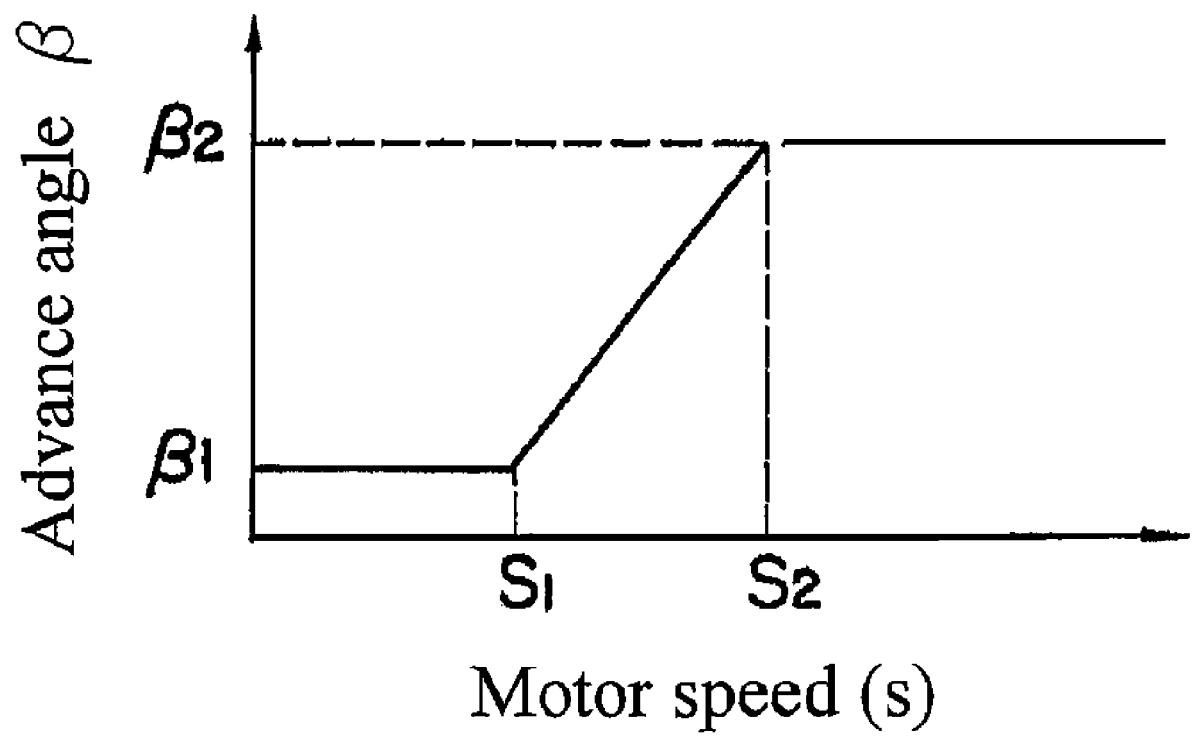
FIG. 1(b) is a schematic diagram showing a relation between the advance angle and a motor rotating speed of the system in FIG. 1(a)
Figure 2A:
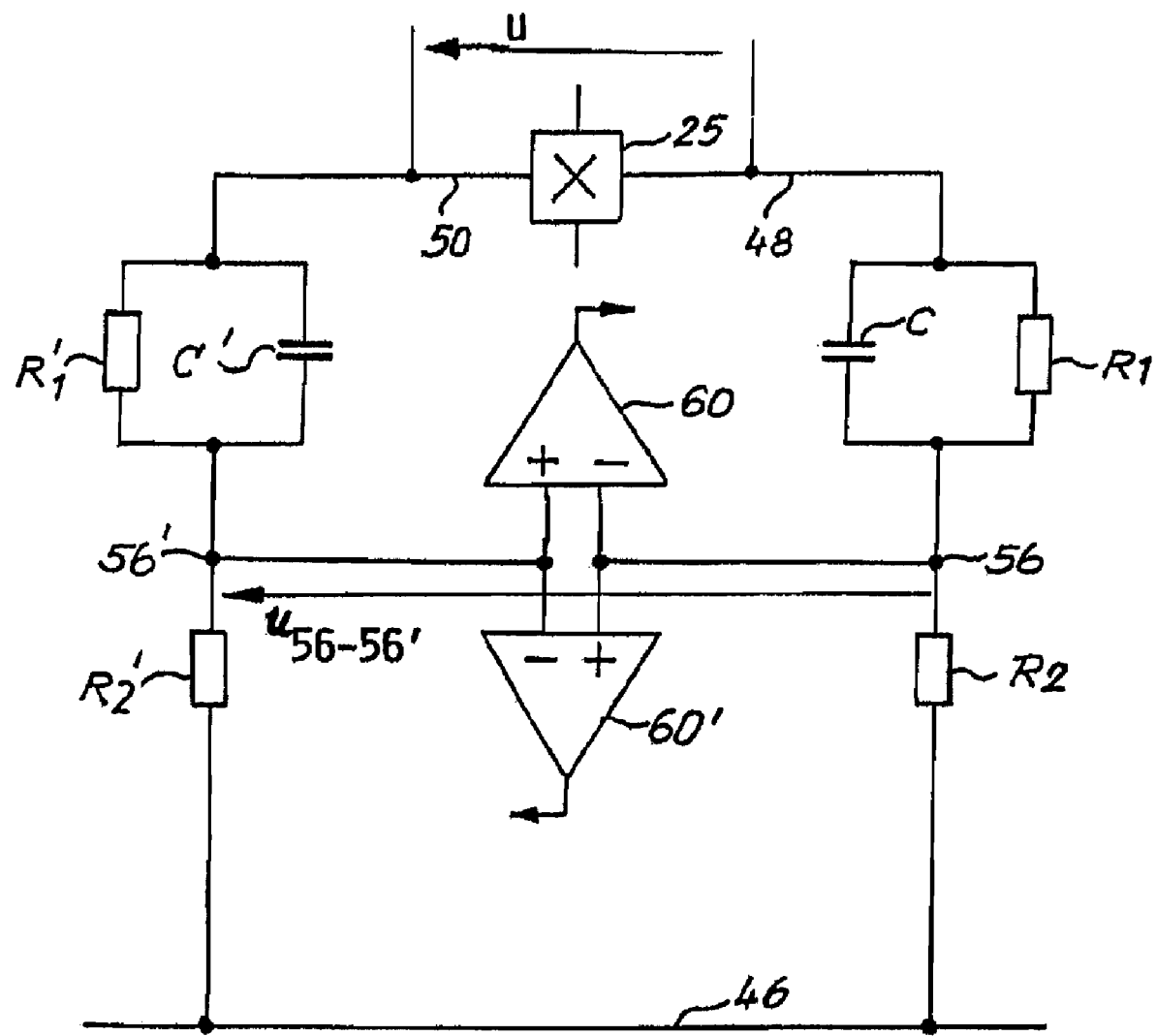
FIG. 2(a) is a schematic diagram disclosed in the WO Patent No. 97/33363 showing a conventional circuit for controlling an advance angle of a brushless DC electric machine.
Figure 2B:
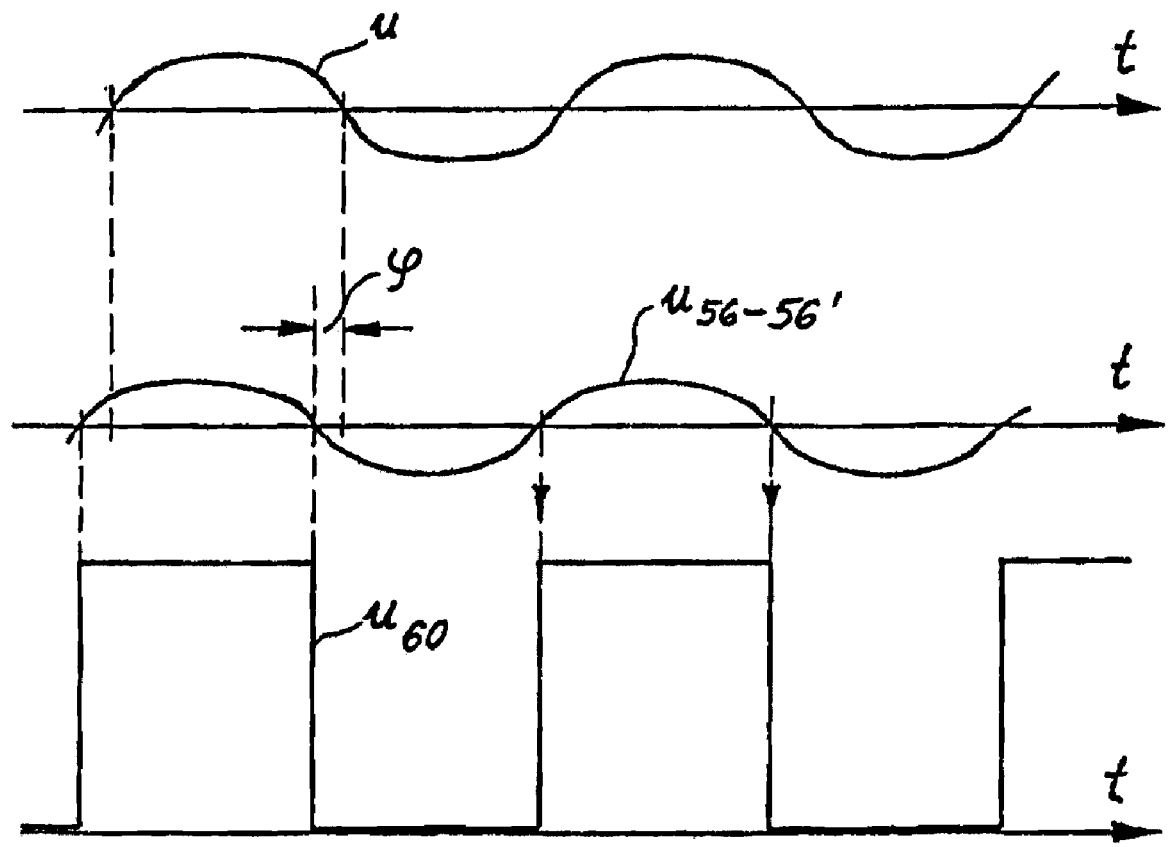
FIG. 2(b) is a waveform diagram showing signals obtained from the circuit in FIG. 2(a)
Figure 3:
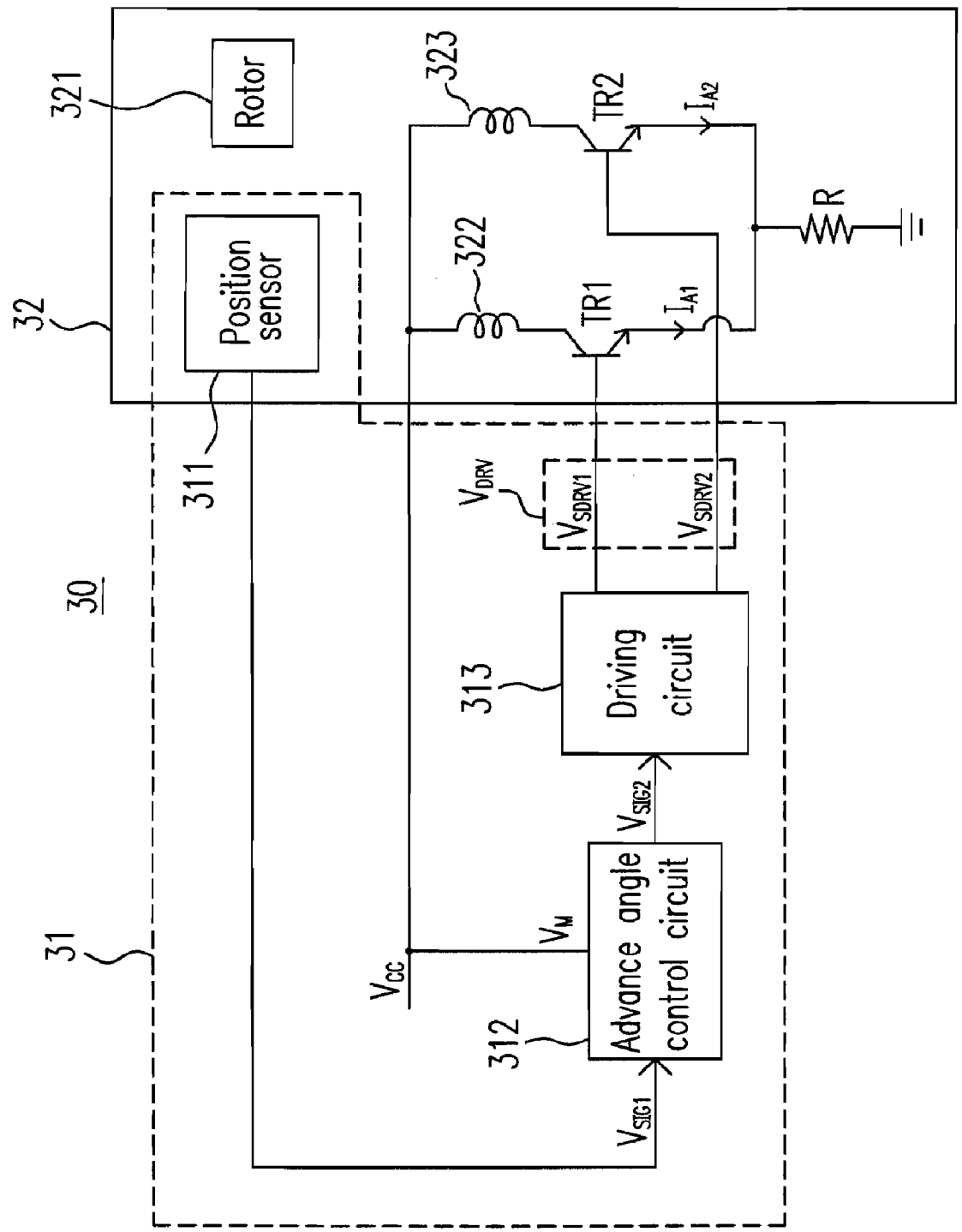
FIG. 3 is a schematic structural diagram showing a circuit for a controller of a brushless DC electric machine according to the first embodiment of the present invention.

Please refer to FIG. 3, which is a schematic structural diagram showing a circuit for a controller of a brushless DC electric machine according to the first embodiment of the present invention. In FIG. 3, a brushless DC electric machine system 30 includes the controller 31 of the brushless DC electric machine and a brushless DC motor 32, wherein the brushless DC motor 32 is an applicable device belonging to the brushless DC electric machine. The brushless DC motor 32 includes a rotor 321 and at least a stator winding 322 and 323 powered by a driving voltage $V_{CC}$, wherein the stator winding includes a first stator winding 322 and a second stator winding 323. The controller 31 of the brushless DC electric machine includes a position sensor 311, an advance angle control circuit 312, and a driving circuit 313.

One kind of common position sensor is a Hall sensor. A practical commutation position of the brushless DC motor 32 is predetermined. The position sensor 311 is installed on the stator of the brushless DC motor 32 and produces a position signal $V_{SIG1}$ having position information of the rotor 321, wherein the position signal $V_{SIG1}$ is in advance of the practical commutation position of the brushless DC motor 32 is predetermined.

The common connection point of the first stator winding 322 and the second stator winding 323 receives the driving voltage $V_{CC}$ supplying power to the first stator winding 322 and the second stator winding 323.

The advance angle control circuit 312 receives the position signal $V_{SIG1}$ and a driving voltage reproduction signal $V_M$. In the present embodiment, because the input terminal of the driving voltage reproduction signal $V_M$ is coupled to the driving voltage $V_{CC}$, the driving voltage reproduction signal $V_M$ is identical to the driving voltage $V_{CC}$. Therefore, the rotating speed is proportional to the driving voltage $V_{CC}$ applied to the stator windings 322 and 323 on the characteristic; that is, the driving voltage reproduction signal $V_M$ is proportional to the rotating speed of the brushless DC motor 32. The advance angle control circuit 312 delays the position signal $V_{SIG1}$ by a delay time $T_{DA}$ and produces a commutation control signal $V_{SIG2}$; that is, the commutation control signal $V_{SIG2}$ lags the position signal $V_{SIG1}$ by the delay time $T_{DA}$.

The driving circuit 313 receives the commutation control signal $V_{SIG2}$ for outputting a driving signal $V_{DRV}$. The driving signal $V_{DRV}$ is for controlling a commutation of the stator windings 322 and 323 of the brushless DC motor 32.

In FIG. 3, the brushless DC motor 32 further includes a first transistor TR1 and a second transistor TR2. The first transistor TR1 controls a first winding current $I_{A1}$ flowing through the first stator winding 322, and the second transistor TR2 controls a second winding current $I_{A2}$ flowing through the second stator winding 323. The driving signal $V_{DRV}$ further includes a first driving sub-signal $V_{SDRV1}$ controlling the first winding current $I_{A1}$ and a second driving sub-signal $V_{SDRV2}$ controlling the second winding current $I_{A2}$.

Figure 4:
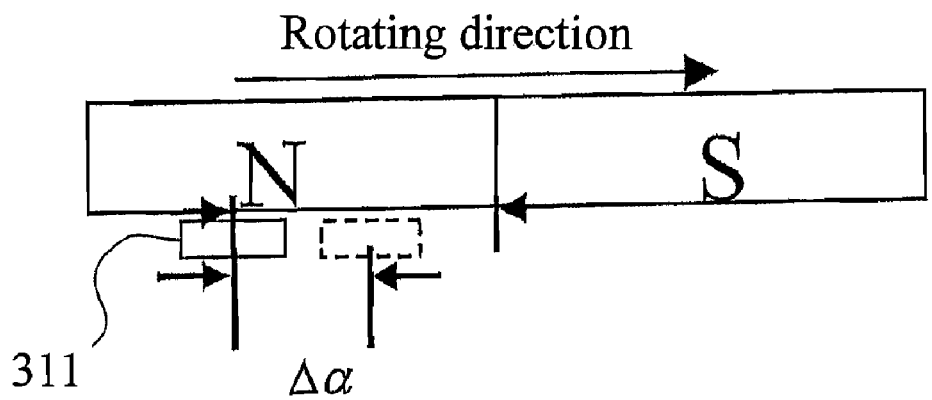
FIG. 4 is a schematic diagram showing the position relation of the position sensor according to the present invention.

Afterward, the optimum of the advance angle of the brushless DC motor 32 is described. Please refer to FIG. 4, which is a schematic diagram showing the position relation of the position sensor according to the present invention. In FIG. 4, the position sensor 311 is on the stator side of the brushless DC motor 32. Relative to the condition that the advance angle is suitable and that the brushless DC motor 32 has a fit commutation position, the position sensor 311 is moved along a reverse rotating direction (as shown by an arrow) of the rotor by a prepositioned angle $\Delta\alpha$ and is fixed. Afterward, under a corresponding rotating speed (or driving voltage $V_{CC}$), the advance angle is made optimum through control of the advance angle control circuit 312 and the driving circuit 313 according to the position signal $V_{SIG1}$, the driving voltage reproduction signal $V_M$, and the delay time $T_{DA}$. The optimum of the advance angle is implemented through delaying the position signal $V_{SIG1}$ by the delay time $T_{DA}$.

Figure 5:
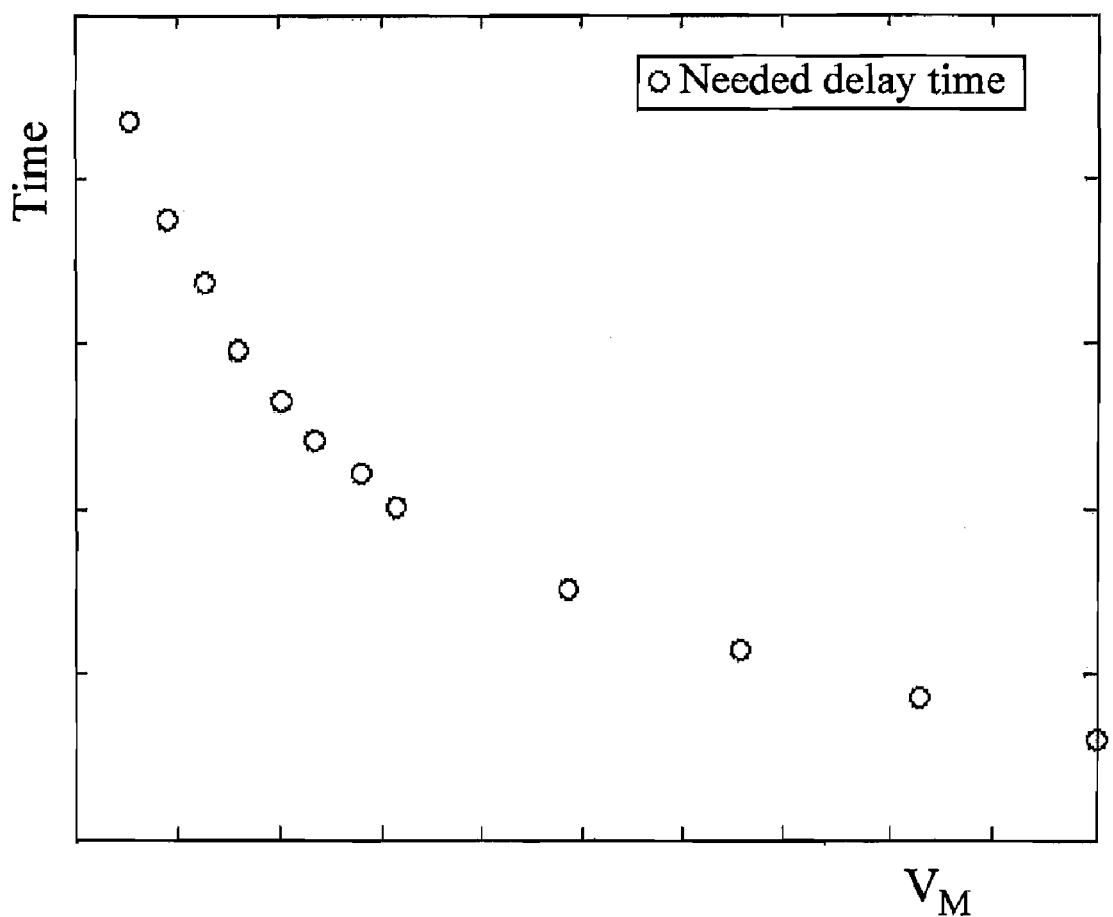
FIG. 5 is a schematic data diagram showing the relation between a needed delay time and the driving voltage reproduction signal under an optimum state for the advance angle according to the present invention.

Please refer to FIG. 5, which is a schematic data diagram showing the relation between a needed delay time and the driving voltage reproduction signal under an optimum state for the advance angle according to the present invention. The data source in FIG. 5 is described as follows. On condition that the position sensor 311 has the prepositioned angle $\Delta\alpha$, a known commutation control signal $V_{SIG2F}$ is received by the driving circuit 313 controlling the brushless DC motor 32, so that the advance angle of the brushless DC motor 32 is made optimum. The relation between a needed delay time $T_{DF}$ and the driving voltage reproduction signal $V_M$ can be obtained and is shown as multiple-point data in FIG. 5, wherein the commutation control signal $V_{SIG2F}$ lags the position signal $V_{SIG1}$ by the needed delay time $T_{DF}$. As shown in FIG. 5, the driving voltage reproduction signal $V_M$ is inversely proportional to the needed delay time $T_{DF}$.

Figure 6:
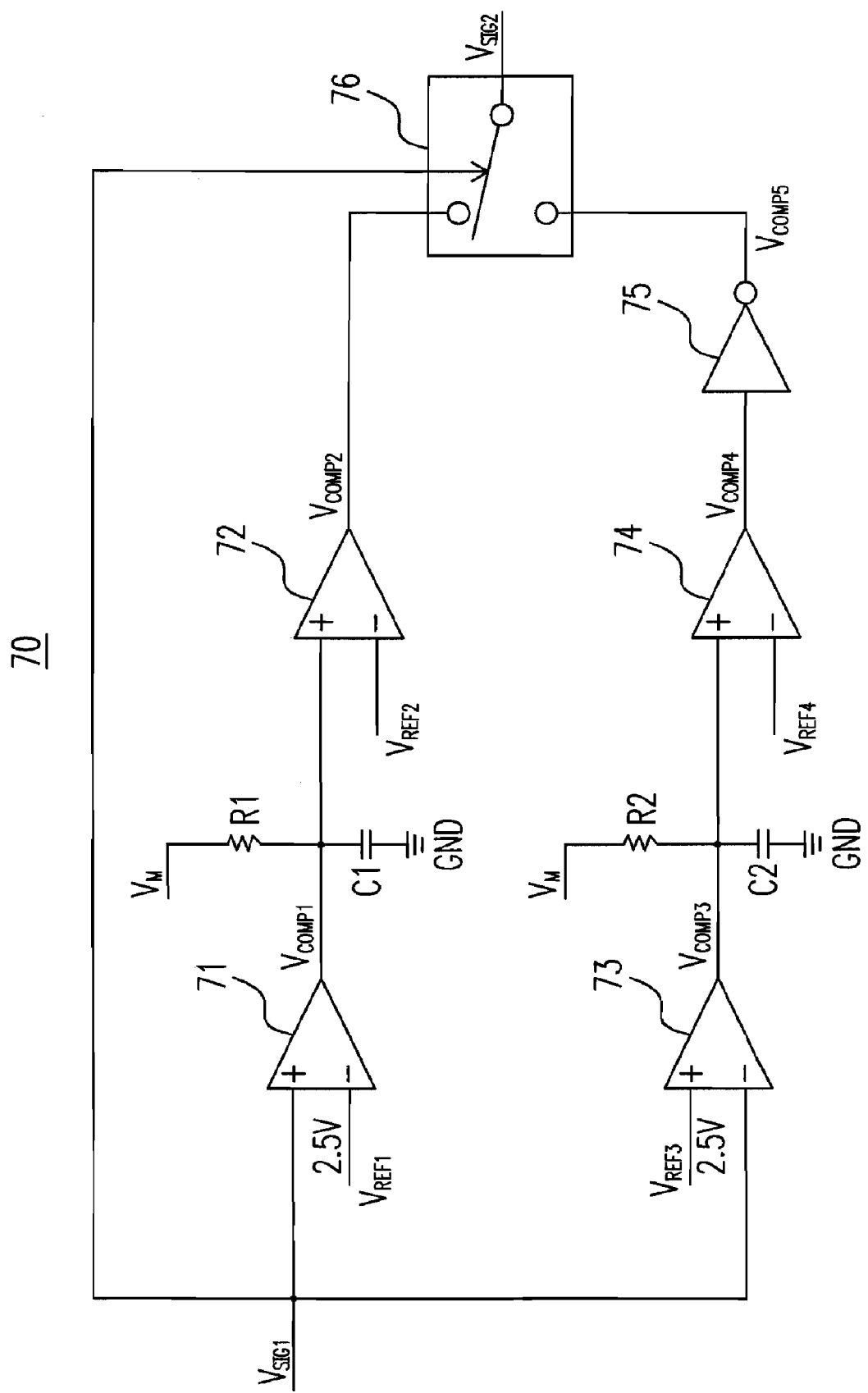
FIG. 6 is a schematic diagram showing a circuit for the advance angle control circuit according to the present invention.

Please refer to FIG. 6, which is a schematic diagram showing a circuit for the advance angle control circuit according to the present invention. It is the object of a circuit 70 in FIG. 6 that a rising edge of the commutation control signal $V_{SIG2}$ lags a corresponding rising edge of the position signal $V_{SIG1}$ by a first delay time $T_{DP1}$, a falling edge of the commutation control signal $V_{SIG2}$ lags a corresponding falling edge of the position signal $V_{SIG1}$ by a second delay time $T_{DP2}$, and the first delay time $T_{DP1}$ and the second delay time $T_{DP2}$ are made equal to the delay time $T_{DA}$. Therefore, the produced delay time $T_{DA}$ tends to coincide with the data in FIG. 5 and the advance angle being optimum can be guaranteed. Besides, the present circuit 70 can resist interference of noise and its system is also stable and reliable.

The advance angle control circuit 70 shown in FIG. 6 includes a first comparing circuit 71, a second comparing circuit 72, a third comparing circuit 73, a fourth comparing circuit 74, a NOT gate, and a controllable switch. The first delay time $T_{DP1}$ is formed through control of the magnitude of the potential of the driving voltage reproduction signal $V_M$ by a first resistor R1 and a first capacitor C1 coupled to the first comparing circuit 71. The second delay time $T_{DP2}$ is formed through control of the magnitude of the potential of the driving voltage reproduction signal $V_M$ by a second resistor R2 and a second capacitor C2 coupled to the third comparing circuit 73.

The first comparing circuit 71 has a non-inverting input terminal receiving the position signal $V_{SIG1}$, an inverting input terminal receiving a first reference potential $V_{REF1}$, and an output terminal receiving the driving voltage reproduction signal $V_M$ through the first resistor R1 and coupled to a ground potential GND through the first capacitor C1, and compares the position signal $V_{SIG1}$ with the first reference potential $V_{REF1}$ for outputting a first comparing signal $V_{COMP1}$ at the output terminal. When the position signal $V_{SIG1}$ starts to be greater than the first reference potential $V_{RF1}$, the first delay time $T_{DP1}$ starts and the driving voltage reproduction signal $V_M$ starts to charge the first capacitor C1 through the first resistor R1, wherein a charging voltage of the first capacitor C1 is equal to the first comparing signal $V_{COMP1}$.

The second comparing circuit 72 has a non-inverting input terminal receiving the first comparing signal $V_{COMP1}$, and an inverting input terminal receiving a second reference potential $V_{REF2}$, and compares the first comparing signal $V_{COMP1}$ with the second reference potential $V_{REF2}$ for outputting a second comparing signal $V_{COMP2}$. When the first comparing signal $V_{COMP1}$ starts to be greater than the second reference potential $V_{REF2}$, the second comparing signal $V_{COMP2}$ is inverted to a high logical level and the first delay time $T_{DP1}$ stops.

The third comparing circuit 73 has an inverting input terminal receiving the position signal $V_{SIG1}$, an non-inverting input terminal receiving a third reference potential $V_{REF3}$, and an output terminal receiving the driving voltage reproduction signal $V_M$ through the second resistor R2 and coupled to a ground potential GND through the second capacitor C2, and compares the position signal $V_{SIG1}$ with the third reference potential $V_{REF3}$ for outputting a third comparing signal $V_{COMP3}$ at the output terminal. When the position signal $V_{SIG1}$ starts to be less than the third reference potential $V_{REF3}$, the second delay time $T_{DP2}$ starts and the driving voltage reproduction signal $V_M$ starts to charge the second capacitor C2 through the second resistor R2, wherein a charging voltage of the second capacitor C2 is equal to the third comparing signal $V_{COMP3}$.

The fourth comparing circuit 74 has a non-inverting input terminal receiving the third comparing signal $V_{COMP3}$, and an inverting input terminal receiving a fourth reference potential $V_{REF4}$, and compares the third comparing signal $V_{COMP3}$ with the fourth reference potential $V_{REF4}$ for outputting a fourth comparing signal $V_{COMP4}$. When the third comparing signal $V_{COMP3}$ starts to be greater than the fourth reference potential $V_{REF4}$, the fourth comparing signal $V_{COMP4}$ is inverted to a high logical level.

The NOT gate receives the fourth comparing signal $V_{COMP4}$ and inverts the fourth comparing signal $V_{COMP4}$ for outputting a fifth comparing signal $V_{COMP5}$. When the fifth comparing signal $V_{COMP5}$ is inverted to a low logical level, the second delay time $T_{DP2}$ stops.

The controllable switch 76 has a first selection terminal receiving the second comparing signal $V_{COMP2}$, a second selection terminal receiving the fifth comparing signal $V_{COMP5}$, a control terminal receiving the position signal $V_{SIG1}$, and an output terminal, and selectively switches one of the first selection terminal and the second selection terminal to the output terminal for outputting the commutation control signal $V_{SIG2}$. When the position signal $V_{SIG1}$ is at a high logical level, the commutation control signal $V_{SIG2}$ is identical to the second comparing signal $V_{COMP2}$, and when the position signal $V_{SIG1}$ is at a low logical level, the commutation control signal $V_{SIG2}$ is identical to the fifth comparing signal $V_{COMP5}$.

Figure 7A:
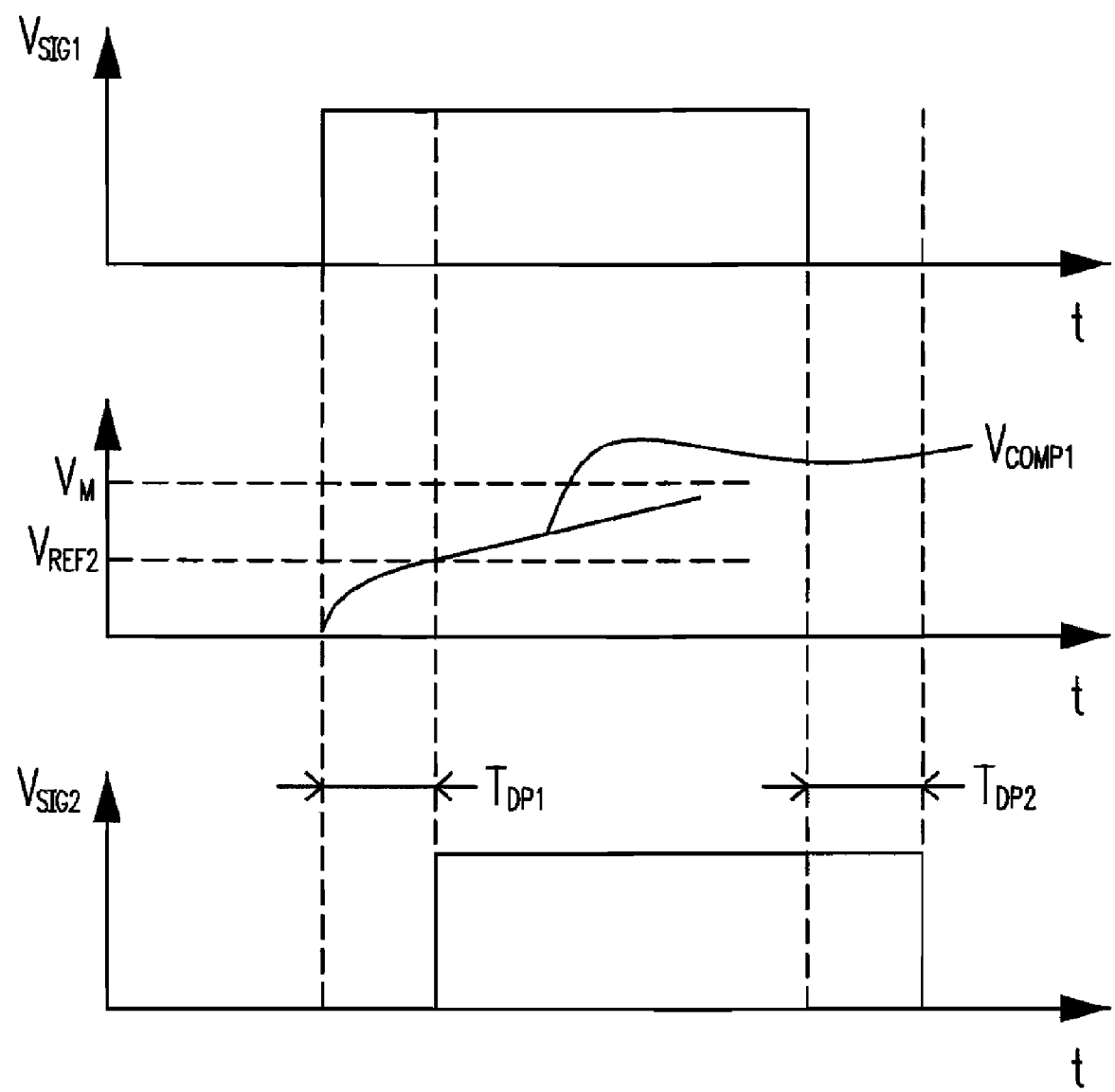
FIG. 7(a) and FIG. 7(b) are waveform diagrams showing signals obtained from the circuit in FIG. 6 according to the present invention.
Figure 7B:
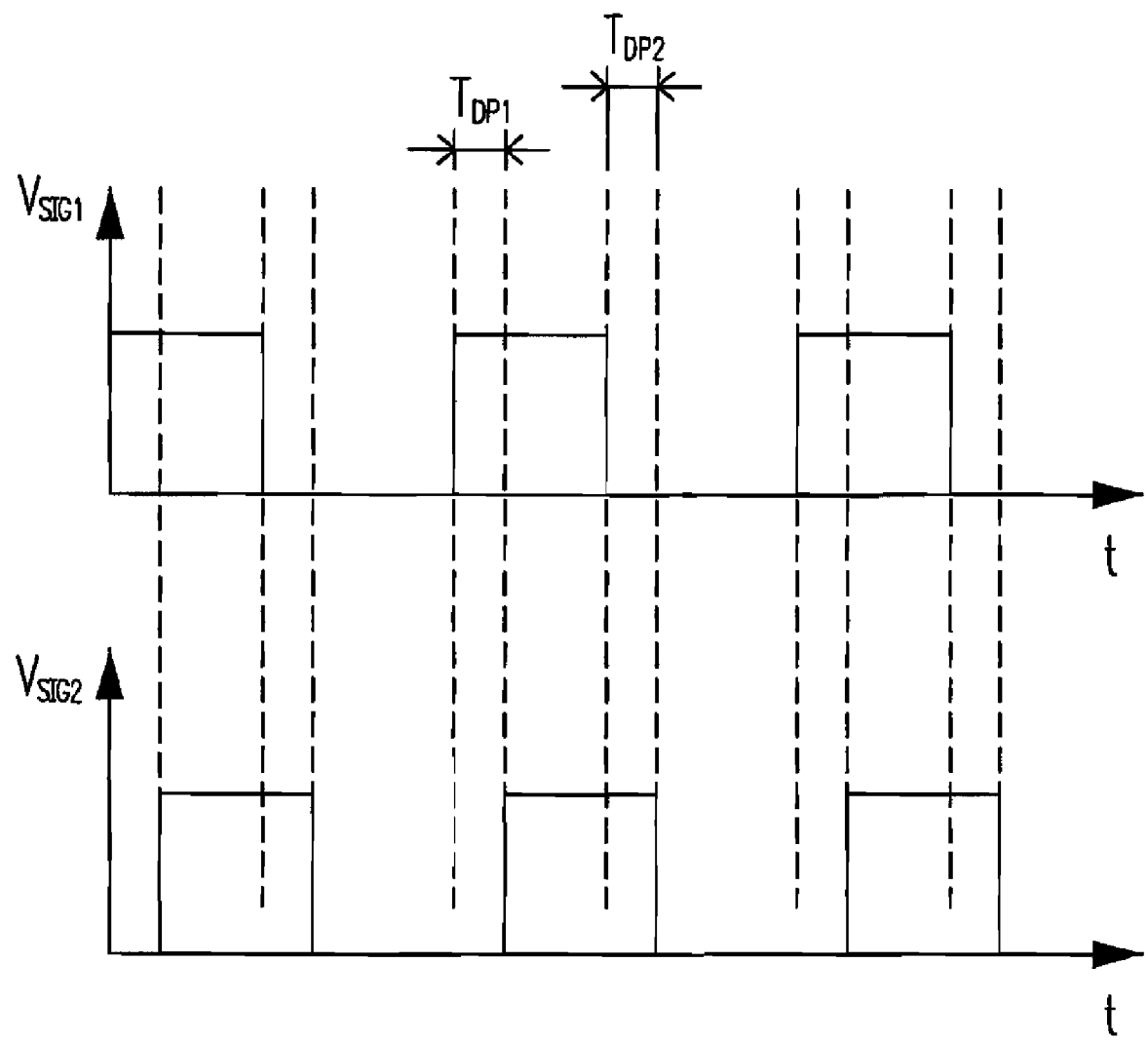

Please refer to FIG. 7($a$) and FIG. 7($b$), which are waveform diagrams showing signals obtained from the circuit in FIG. 6 according to the present invention. Waveforms in FIG. 7($a$) are those of the position signal $V_{SIG1}$, the first comparing signal $V_{COMP1}$, and the commutation control signal $V_{SIG2}$. Besides, a waveform (not shown) of the third comparing signal $V_{COMP3}$ is similar to the waveform of the first comparing signal $V_{COMP1}$. As shown in FIG. 7($a$), the magnitude of the first delay time $T_{DP1}$ is determined according to magnitudes of three quantities, which are a product of the first resistor R1 and the first capacitor C1, the second reference potential $V_{REF2}$, and the driving voltage reproduction signal $V_M$. The magnitude of the second delay time $T_{DP2}$ is determined according to magnitudes of three quantities, which are a product of the second resistor R2 and the second capacitor C2, the fourth reference potential $V_{REF4}$, and the driving voltage reproduction signal $V_M$. Therefore, the produced delay time $T_{DA}$ of the circuit 70 in FIG. 6 has a tendency to coincide with the data in FIG. 5 for guaranteeing the advance angle optimum.

In FIG. 7($b$), there are two multiple-period waveforms of the position signal $V_{SIG1}$ and the commutation control signal $V_{SIG2}$, and the time relation between the position signal $V_{SIG1}$ and the commutation control signal $V_{SIG2}$ is shown therein.

Figure 8:
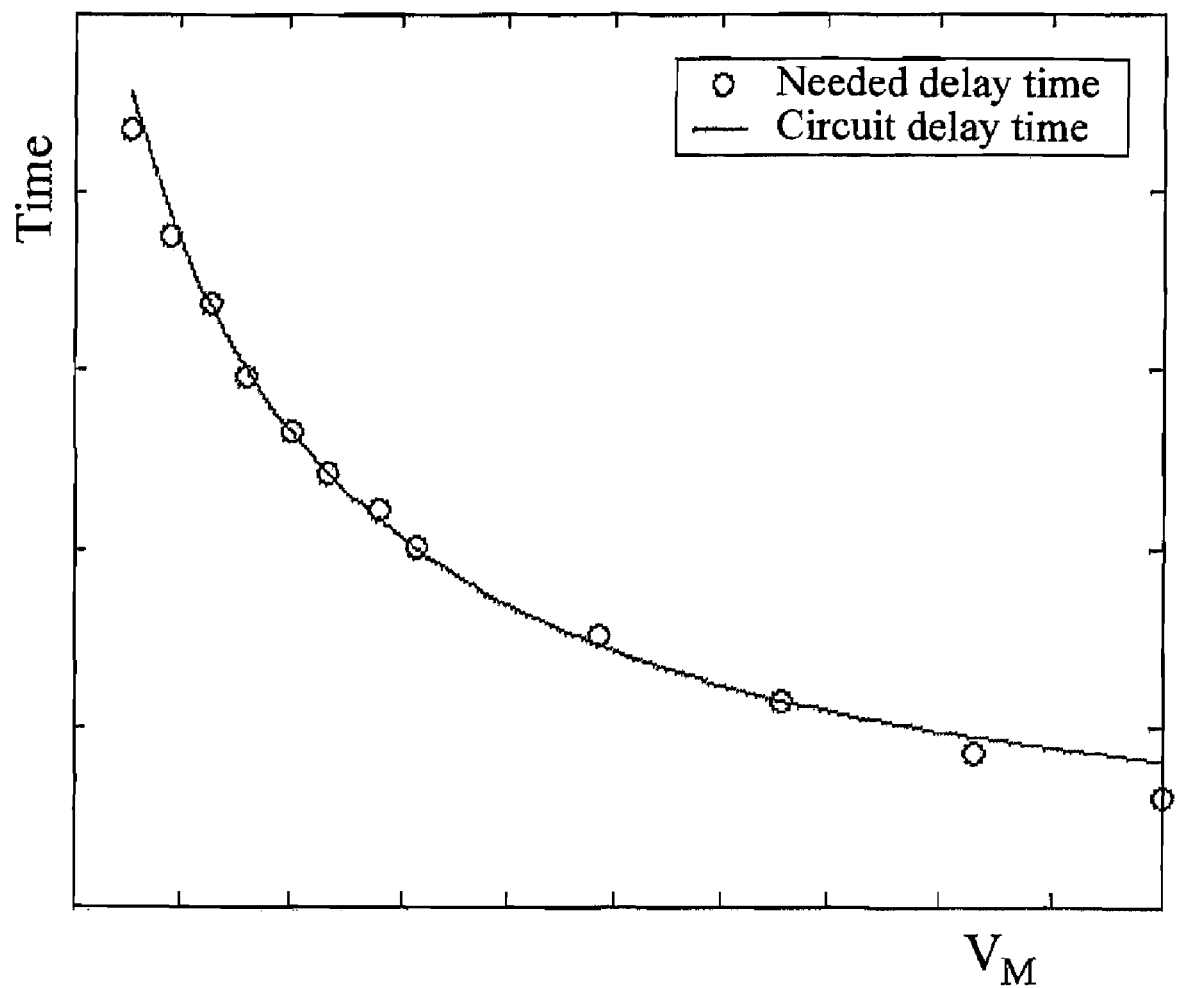
FIG. 8 is a schematic diagram showing a comparison between a needed delay time in FIG. 5 and a circuit delay time according to the present invention.

Please refer to FIG. 8, which is a schematic diagram showing a comparison between a needed delay time in FIG. 5 and a circuit delay time according to the present invention. Dotted data points in FIG. 8 come from FIG. 5. A curve in FIG. 8 expresses the relation between a produced circuit delay time and the driving voltage reproduction signal $V_M$, wherein the produced circuit delay time corresponds to one of the first delay time $T_{DP1}$ and the second delay time $T_{DP2}$. As shown in FIG. 8, the circuit delay time produced by the advance angle control circuit 70 has a tendency to coincide with the practical needed delay time $T_{DF}$ through the establishment of at least a time constant (a product of a resistance and a capacitance) and reference potentials.

Figure 9:
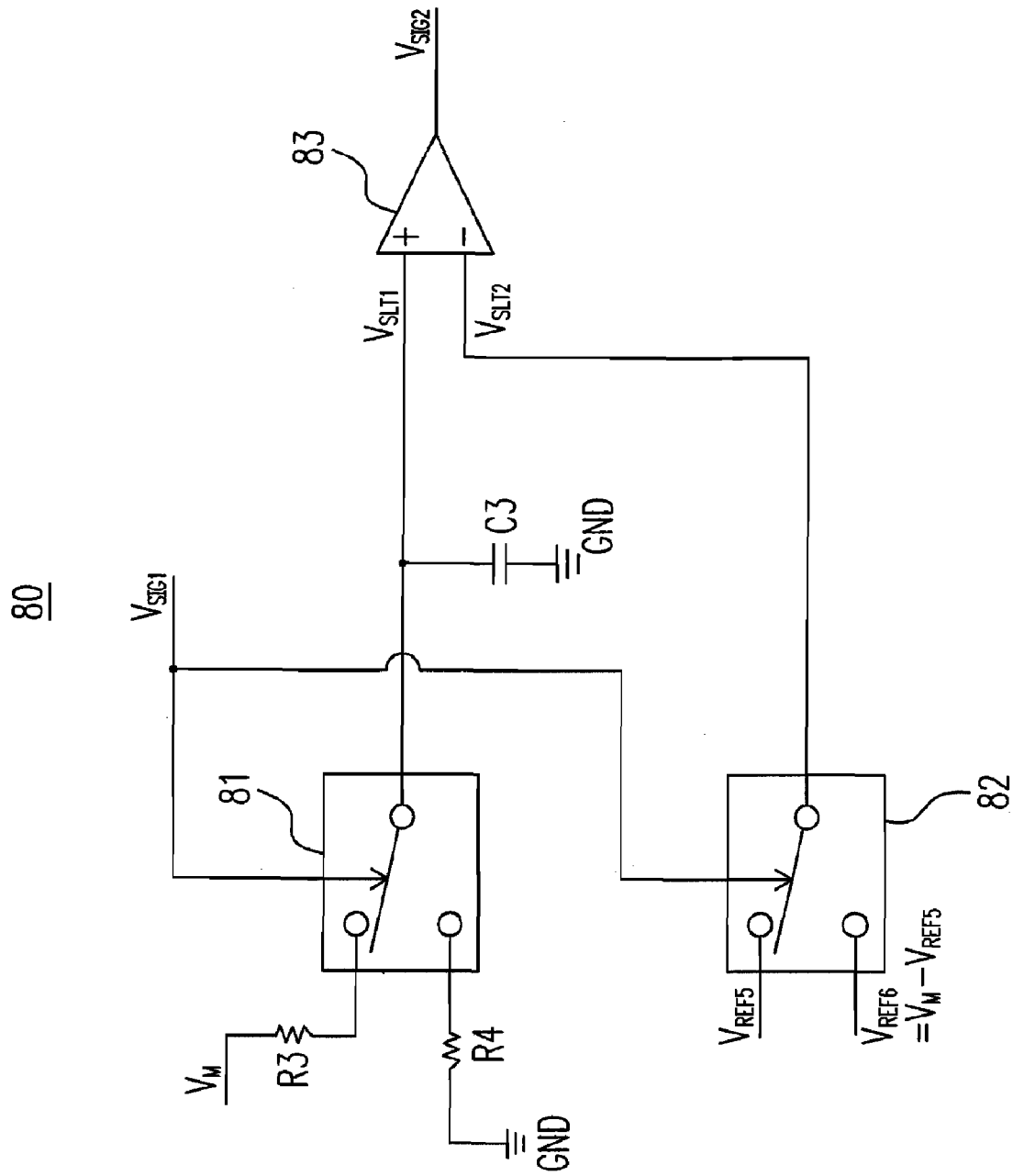
FIG. 9 is a schematic diagram showing another circuit for the advance angle control circuit according to the present invention.

Please refer to FIG. 9, which is a schematic diagram showing another circuit for the advance angle control circuit according to the present invention. It is the object of a circuit 80 in FIG. 9 that a rising edge of the commutation control signal $V_{SIG2}$ lags a corresponding rising edge of the position signal $V_{SIG1}$ by a first delay time $T_{DQ1}$, a falling edge of the commutation control signal $V_{SIG2}$ lags a corresponding falling edge of the position signal $V_{SIG1}$ by a second delay time $T_{DQ2}$, and the first delay time $T_{DQ1}$ and the second delay time $T_{DQ2}$ are made equal to the delay time $T_{D4}$. Therefore, the produced delay time $T_{D4}$ tends to coincide with the practical needed delay time $T_{DF}$.

The circuit 80 in FIG. 9 includes a first controllable switch 81, a second controllable switch 82, and a comparing circuit 83. The first controllable switch has a first selection terminal receiving the driving voltage reproduction signal $V_M$ through a third resistor R3, a second selection terminal coupled to a ground potential GND through a fourth resistor R4, and an output terminal coupled to the ground potential GND through a third capacitor C3, and selects one of the first selection terminal and the second selection terminal to be connected to the output terminal according to the position signal $V_{SIG1}$ for outputting a first selection signal $V_{SLT1}$ at the output terminal. When the position signal $V_{SIG1}$ is inverted to a high logical level, the first delay time $T_{DQ1}$ starts and the driving voltage reproduction signal $V_M$ starts to charge the third capacitor C3 by the third resistor R3. When the position signal $V_{SIG1}$ is inverted to a low logical level, the second delay time $T_{DQ2}$ starts and the first selection signal $V_{SLT1}$ on the third capacitor C3 is discharged by the fourth resistor R4.

The second controllable switch has a first selection terminal receiving a fifth reference potential $V_{REF5}$, a second selection terminal receiving a sixth reference potential $V_{REF6}$, a control terminal receiving the position signal $V_{SIG1}$, and an output terminal, and selectively switches one of the first selection terminal and the second selection terminal to the output terminal for outputting the commutation control signal $V_{SIG2}$ at the output terminal. The sixth reference potential $V_{REF6}$ is a difference between the driving voltage reproduction signal $V_M$ and the fifth reference potential $V_{REF5}$. When the position signal $V_{SIG1}$ is at the high logical level, the second selection signal $V_{SLT2}$ is identical to the fifth reference potential $V_{REF5}$, and when the position signal $V_{SIG1}$ is at the low logical level, the second selection signal $V_{SLT2}$ is identical to the sixth potential $V_{REF6}$.

The comparing circuit 83 has a non-inverting input terminal receiving the first selection signal $V_{SLT1}$, and an inverting input terminal receiving the second selection signal $V_{SLT2}$, and compares the first selection signal $V_{SLT1}$ with the second selection signal $V_{SLT2}$ for outputting the commutation control signal $V_{SIG2}$. When the commutation control signal $V_{SIG2}$ is at the high logical level, the first delay time $T_{DQ1}$ is performed, and when the commutation control signal $V_{SIG2}$ is at the low logical level, the second delay time $T_{DQ2}$ is performed.

Besides the aforementioned two embodiments, as long as the circuit where the relation between the delay time $T_{D4}$ and the driving voltage reproduction signal $V_M$ for a circuit can be implemented as the inverse proportional relation shown in FIG. 8, it belongs to the embodiment of the present invention.

Figure 10:
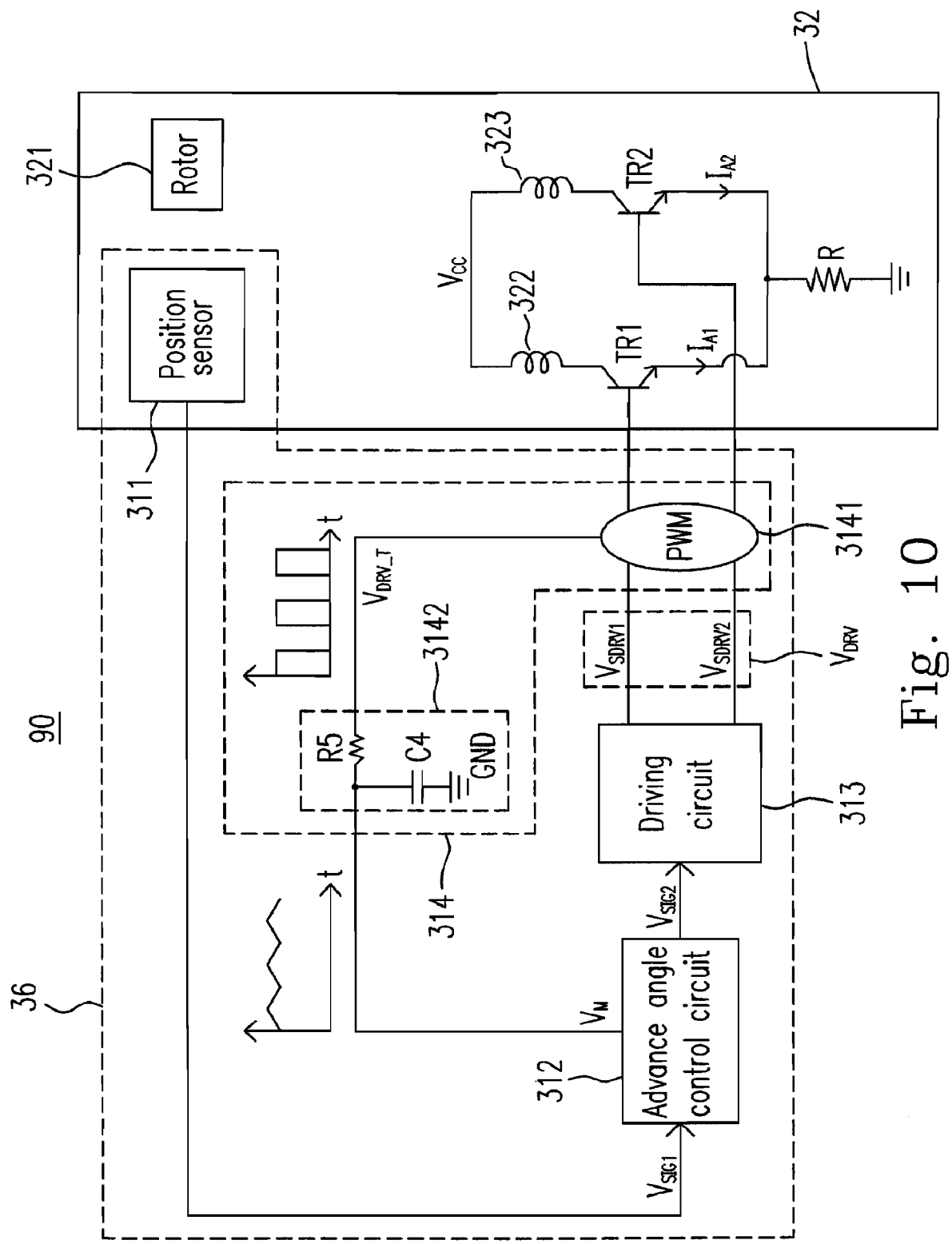
FIG. 10 is a schematic structural diagram showing a circuit for a controller of a brushless DC electric machine according to the second embodiment of the present invention.

Please refer to FIG. 10, which is a schematic structural diagram showing a circuit for a controller of a brushless DC electric machine according to the second embodiment of the present invention. A brushless DC electric machine system 90 in FIG. 10 is a deformation of the brushless DC electric machine system 30 in FIG. 3, and the identical reference numerals therein have the same functions. In FIG. 10, the driving circuit 313 of the controller 31 of the brushless DC electric machine uses a pulse width modulation (PWM) for regulating speed. The driving signal $V_{DRV}$ includes pulses widths of which are variable; that is, the width of the pulse in the driving signal $V_{DRV}$ expresses the magnitude of the rotating speed. Therefore, a voltage signal produced by filtering the driving signal $V_{DRV}$ can be used for controlling a delay time $T_{D4}$ produced by the advance angle control circuit 312 and for reproducing a driving voltage reproduction signal $V_M$.

In FIG. 10, a driving voltage reproduction signal $V_M$ derives from the driving signal $V_{DRV}$ and is not directly coupled to the driving voltage $V_{CC}$ of stator windings 322 and 323. The controller 36 of the brushless DC electric machine in the present embodiment further includes a voltage sensing circuit 314 having a driving signal sensor 3141 and a low-pass filter 3142. The driving signal sensor 3141 senses the driving signal $V_{DRV}$ for outputting a driving sensing signal $V_{DRV\_T}$. The low-pass filter 3142 having a fifth resistor R5 and a fourth capacitor C4 receives the driving sensing signal $V_{DRV\_T}$ for outputting the driving voltage reproduction signal $V_M$, so that a corresponding relation of reproduction is present between the driving voltage reproduction signal $V_M$ and the driving voltage $V_{CC}$.

The aforementioned embodiments are illustrated for a single-phase electric machine. However, the control principle therein is also effective for a three-phase electric machine.

Afterward, referring to FIG. 3 again, a method for controlling a brushless DC electric machine is provided according to the present invention. There is a brushless DC motor 32 having a rotor 321 and at least a stator winding 322 and 323 powered by a driving voltage $V_{CC}$, and the method includes the following steps. Firstly, a position signal $V_{SIG1}$ of the rotor 321 is obtained by leading a position sensor with respect to a first commutation position. Next, a driving voltage reproduction signal $V_M$ of the driving voltage $V_{CC}$ is obtained. Next, a commutation control signal $V_{SIG2}$ lagging the position signal $V_{SIG1}$ by a delay time based on the position signal and the driving voltage reproduction signal being inversely proportional to the delay time $T_{D4}$ is output. Next, a commutation of the stator windings 322 and 323 based on the commutation control signal $V_{SIG2}$ is driven.

The device and the method for controlling the brushless DC electric machine have the main feature that the commutation control signal is produced based on the position signal and the driving voltage reproduction signal $V_M$ and lagging the position signal by the delay time. Therefore, the advance angle of the brushless DC electric machine tends to be optimum in the whole scope of the rotating speed, and control architecture with high performance, low cost, good robustness is provided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A controller of a brushless DC electric machine having a rotating speed, a rotor and at least a stator winding powered by a driving voltage, comprising:
 a position sensor fixed at a position shifted from a commutation position of the brushless DC electric machine by a prepositioned angle in a reverse rotating direction of the rotor for outputting a position signal;
 an advance angle control circuit receiving the position signal and a driving voltage reproduction signal reproduced from the driving voltage and outputting a commutation control signal lagging the position signal by a first delay time, wherein the driving voltage reproduction signal is proportional to the rotating speed of the brushless DC electric machine; and a driving circuit receiving the commutation control signal for outputting a driving signal for controlling the commutation of the brushless DC electric machine.

2. A controller of a brushless DC electric machine according to claim 1, wherein the driving voltage reproduction signal is inversely proportional to the first delay time.

3. A controller of a brushless DC electric machine according to claim 1, wherein a rising edge of the commutation control signal lags a corresponding rising edge of the position signal by a second delay time, a falling edge of the commutation control signal lags a corresponding falling edge of the position signal by a third delay time, and the second delay time and the third delay time are equal to the first delay time, and the controller further comprises:

a first comparing circuit having an output terminal receiving the driving voltage reproduction signal through a first resistor and coupled to a ground potential through a first capacitor, and comparing the position signal with a first reference potential for outputting a first comparing signal;

a second comparing circuit comparing the first comparing signal received from the first comparing circuit with a second reference potential for outputting a second comparing signal;

a third comparing circuit having an output terminal receiving the driving voltage reproduction signal through a second resistor and coupled to a ground potential through a second capacitor, and comparing the position signal with a third reference potential for outputting a third comparing signal;

a fourth comparing circuit comparing the third comparing signal received from the third comparing circuit with a fourth reference potential for outputting a fourth comparing signal;

a NOT gate inverting the fourth comparing signal received for outputting a fifth comparing signal; and a controllable switch selectively switched to one of the second comparing signal and the fifth comparing signal according to the position signal for outputting the commutation control signal based thereon.

4. A controller of a brushless DC electric machine according to claim 3, wherein:

when the position signal starts to be greater than the first reference potential, the second delay time starts and the driving voltage reproduction signal starts to charge the first capacitor through the first resistor;

when the first comparing signal starts to be greater than the second reference potential, the second comparing signal is inverted to a first high logical level and the second delay time stops;

when the position signal starts to be less than the third reference potential, the third delay time starts and the driving voltage reproduction signal starts to charge the second capacitor through the second resistor;

when the third comparing signal starts to be greater than the fourth reference potential, the fourth comparing signal is inverted to a second high logical level;

when the fifth comparing signal is inverted to a low logical level, the third delay time stops; and when the position signal is at a high logical level, the commutation control signal is identical to the second comparing signal, and when the position signal is at a low logical level, the commutation control signal is identical to the fifth comparing signal.

5. A controller of a brushless DC electric machine according to claim 1, wherein a rising edge of the commutation control signal lags a corresponding rising edge of the position signal by a second delay time, a falling edge of the commutation control signal lags a corresponding falling edge of the position signal by a third delay time, and the second delay time and the third delay time are equal to the first delay time, and the controller further comprises:

a first controllable switch having a first selection terminal receiving the driving voltage reproduction signal through a first resistor, a second selection terminal coupled to a ground potential through a second resistor, a control terminal receiving the position signal, and an output terminal coupled to the ground potential through a capacitor, and selecting one of the first selection terminal and the second selection terminal to be connected to the output terminal for outputting a first selection signal by the position signal;

a second controllable switch selectively switched to one of a first reference potential and a second reference potential for outputting a second selection signal; and a comparing circuit comparing the first selection signal with the second selection signal for outputting the commutation control signal.

6. A controller of a brushless DC electric machine according to claim 5, wherein:

when the position signal is inverted to a high logical level, the second delay time starts and the driving voltage reproduction signal starts to charge the capacitor by the first resistor, and when the position signal is inverted to a low logical level, the third delay time starts and the first selection signal of the capacitor is discharged by the second resistor: and the second reference potential is a difference between the driving voltage reproduction signal and the first reference potential, and when the position signal is at the first high logical level, the second selection signal is identical to the first reference potential, and when the position signal is at the first low logical level, the second selection signal is identical to the second potential.

7. A controller of a brushless DC electric machine according to claim 1, further comprising a voltage signal sensing circuit comprising:

a driving signal sensor sensing the driving voltage for outputting a driving sensing signal; and a low-pass filter receiving the driving voltage sensing signal for outputting the driving voltage reproduction signal.

8. A method for controlling a brushless DC electric machine having a rotating speed, a rotor and at least a stator winding powered by a driving voltage, comprising steps of:

(a) determining a predetermined advance angle;

(b) obtaining a position signal of the rotor from a position sensor;

(c) obtaining a driving voltage reproduction signal of the driving voltage;

(d) outputting a commutation control signal lagging the position signal by a delay time based on the position signal and the driving voltage reproduction signal being inversely proportional to the delay time, wherein the driving voltage reproduction signal is proportional to the rotating speed of the brushless DC electric machine; and (e) driving a commutation of the stator winding based on the commutation control signal.

9. A method for controlling a brushless DC electric machine according to claim 8, wherein the driving voltage is proportional to the rotating speed of the brushless DC electric machine.

10. A method for controlling a brushless DC electric machine according to claim 8, wherein the commutation control signal lagging the position signal by the delay time being inversely proportional to the driving voltage reproduction signal in the step (d) is implemented by an advance angle control circuit having a delay capacitor and a comparing circuit, and the step (d) further comprises steps of:

coupling the delay capacitor to the driving voltage reproduction signal by a controllable switch;

outputting the commutation control signal by the comparing circuit, the delay capacitor, and a reference voltage;

determining whether the delay capacitor is coupled to the driving voltage reproduction signal and is charged by controlling the controllable switch by the position signal; and determining the delay time between the commutation control signal and the position signal by comparing a voltage of the delay capacitor with the reference voltage performed by the comparing circuit.

11. A method for controlling a brushless DC electric machine according to claim 8, wherein the driving voltage reproduction signal is obtained by a voltage signal sensing circuit.

* * * * *